March 10, 1959 A. W. RENFRO 2,876,987
VALVES
Filed March 12, 1956
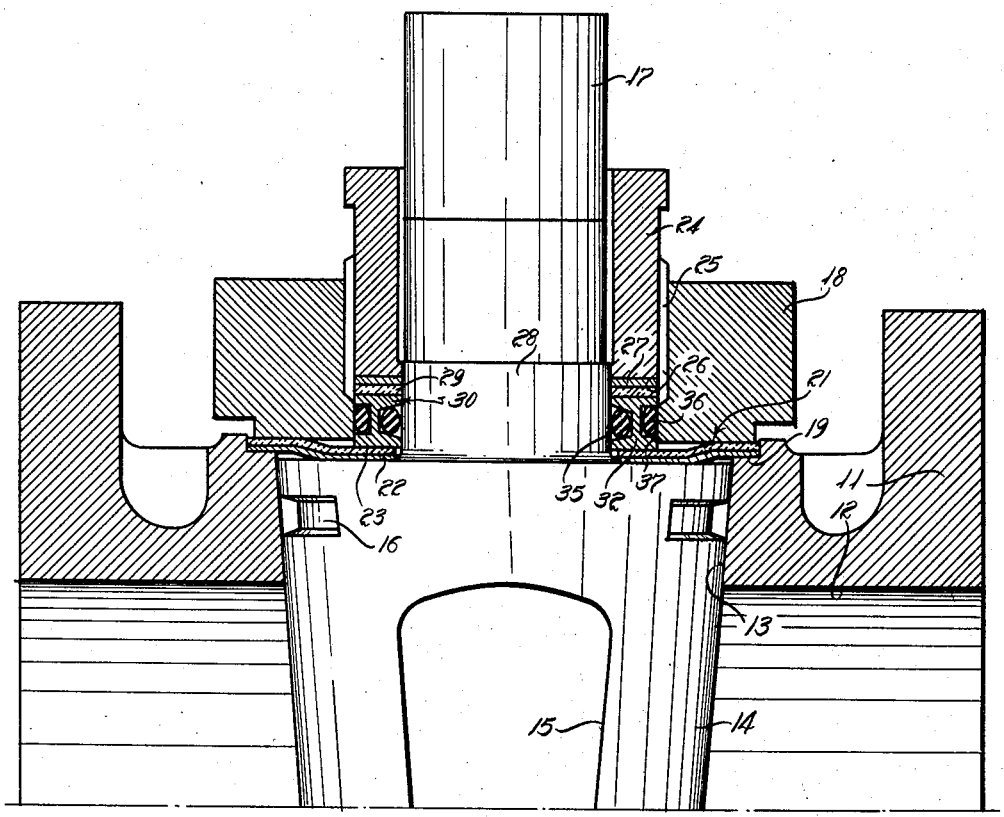
Fig.1
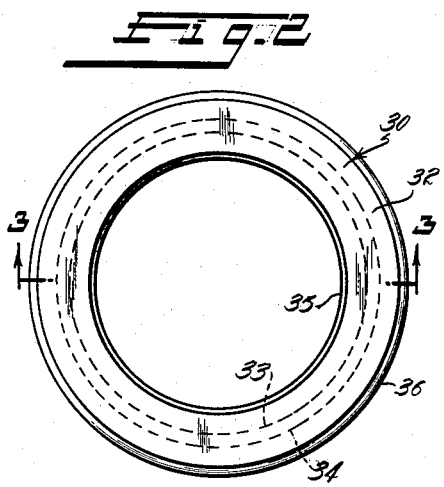
Fig.2
Fig.3
INVENTOR
ANTHONY W. RENFRO
BY
ATTORNEYS United States Patent Office 2,876,987
Patented Mar. 10, 1959

2,876,987

VALVES

Anthony W. Renfro, Sand Springs, Okla., assignor to Rockwell Manufacturing Company, Pittsburgh, Pa., a corporation of Pennsylvania Application March 12, 1956, Serial No. 570,812

7 Claims. (Cl. 251—214)

This invention relates to plug valve stem sealing and particularly to improved sealing assemblies which are efficient seals, easy to install and replace in assembly under field conditions, and do not hamper normal operation of the valve.

The invention will be described for its preferred embodiment as a stem seal for a tapered, cylindrical or ball type plug valve but it will be understood that, while particularly efficient in such combination, the seal assembly itself is capable of other uses.

Prior to the invention it was common and accepted practice to seal against leakage of line fluid outwardly along the stem of a plug valve by providing a compressible ring of asbestos or like material between the stem and the surrounding bore in the valve cover or casing and compress the ring axially of the stem by means of a screw threaded or bolted gland. This axial compression resulted in radial expansion of the ring into engagement with the bore and the stem. The force axially transmitted through the ring was also effective to urge the inner periphery of an annular sealing diaphragm assembly against the top of the plug but that force could not be too tight or it would bind the plug against normal rotation. Also the radial deformation of the asbestos ring relied upon to seal the stem in the opening had to be limited because it might bind the stem against rotation. Thus the proper tightening of the gland had to be effected without producing these excessive axial and radial forces, and usually a compromise arrangement was the best possible with the result that these seals were often inadequate. This was particularly true after wear in the field and it was attempted to adjust the seal tight when leakage appeared. Furthermore, even if the gland was correctly tightened and the asbestos ring properly deformed at first, the asbestos and other such materials used in the ring tend to soon set and harden and lose whatever elasticity they may have had and sometimes they even shrink so that leakage quickly appeared along the valve stem. The worker in the field could only tighten the gland to try to overcome this difficulty but in doing so he usually produced the undesired excessive radial and axial transmitted forces at the ring and the packing soon became either so solid as to act as a brake preventing turning of the valve plug or otherwise deteriorated to the point where further tightening of the gland had no effect on the seal.

It is the major object of the invention to provide a novel plug valve stem seal that is easy to install or replace in the field.

A further object is to provide a novel plug valve stem seal assembly that does not deform axially when the gland is tightened.

It is a further object of the invention to provide a novel replaceable and renewable cartridge type seal assembly for a plug valve stem or the like.

A further object of the invention is to provide a novel plug valve stem seal wherein the valve stem is surrounded by a cartridge assembly that is axially rigid but radially resilient.

A further object of the invention is to provide a novel cartridge type seal wherein inner and outer resilient rings of constant cross-section are mounted in inner and outer peripheral recesses of a rigid annular carrier assembly.

It is a further object of the invention to provide a novel sealing cartridge assembly comprising a rigid ring of I-shape in cross-section having resilient O-rings radially expanded and contracted respectively within its inner and outer peripheral recesses.

Whenever the term O-ring is used herein including the claims such includes rings of circular, oval or any like uniform cross-section wherein the peripheral surface is continuously curved and has no corners in cross-section.

Further objects will appear as the description proceeds in connection with the appended drawings wherein:

Figure 1 is a fragmentary section showing a plug valve stem surrounded by a cartridge type O-ring seal according to a preferred embodiment of the invention;

Figure 2 is a top view of the preferred cartridge assembly; and

Figure 3 is an axial section through Figure 2 on line 3—3.

A plug valve body 11 is formed with an axial through passage 12 intersected at right angles by a tapered plug valve seat 13 that is open at the upper end and in which is seated a tapered valve plug 14 having a through port 15 shown in its closed position in Figure 1 and which is adapted when rotated 90° to that position to form a continuation of passageway 12. The plug 14 is provided with the usual lubricant distributing surface grooves 16 to which lubricant is supplied in a conventional manner as through a passage in the stem 17 but this lubricant distribution feature is not a part of the present invention.

The top of bore 13 is closed by a valve cover 18 which is rigidly bolted to the body 11 as by studs or bolts which are not shown but are conventional. Clamped tightly between the flat bottom surface of cover 18 and an annular shouldered recess 19 in the top of the valve body surrounding the upper end of the bore 13 is an annular flexible laminated diaphragm 21 which may consist of a thin metal annulus 22 and an annular compressible member 23 such as an asbestos washer in superposed relation surrounding the valve stem 17 substantially at its juncture with the plug.

A gland 24 surrounds the valve stem 17 in radial spaced relation and is threaded as at 25 into a central opening in the cover 18, and flat annular lower end surface 26 of the gland abuts slidably an annular metal ring 27 which closely and slidably surrounds the lower enlarged cylindrical end 28 of the valve stem. Below ring 27 is an annular asbestos or like resilient and deformable follower ring 29 that also reasonably closely surrounds the valve stem portion 28. Disposed between follower ring 29 and the top of the inner periphery of the diaphragm 21 is a cartridge seal assembly 30 which is also shown in relaxed condition apart from the valve in Figure 3 and which comprises an important part of the invention herein.

Seal assembly 30 consists essentially of an annulus of hard metal or equivalent rigid material which is substantially I-shaped in cross-section, having an internal circular groove 33 and an external circular groove 34. Mounted in those grooves are so-called O-rings 35 and 36, respectively, which in the assembly of Figure 1 are deformed into sealing engagement between the annulus 32 and the adjacent peripheral surfaces of the valve stem and the cover respectively.

The outer groove 34 is generally rectangular (Figure 3) and its axial dimension is greater than the relaxed diameter of the O-ring 36 and its depth is less than the relaxed diameter of O-ring 36, so that in the assembly of Figure 1 ring 36 will be compressed substantially radially only but is free to expand in the direction of the longitudinal axis of the stem and plug. The inner groove 33 likewise is of greater axial dimension than the relaxed diameter of ring 35 and its depth is less than the relaxed diameter of ring 35, so that in the assembly of Figure 1 it will be compressed substantially radially only but is free to expand in the direction of the stem axis. The upper and lower walls of groove 33 diverge toward the valve stem in the assembly for ease of assembly into the cartridge sub-assembly of Figure 3. The lower inner peripheral edge of the circular annulus 32 is chamfered at 38 to facilitate its mounting on the valve stem. It will be noted that grooves 33 and 34 are on opposite cylindrical sides of the web 39 of annulus 32.

These O-rings 35 and 36 are preferably made of an elastic synthetic rubber or like elastomer composition so as to be sufficiently deformable to enable the outer ring 36 to be stretched over the periphery of the metal annulus 32 and then allowed to snap into the groove 34 as shown in Figure 3. Similarly ring 35 is of the same material and sufficiently deformable and elastic to be capable of assuming its normal expanded state after being inserted into the groove 33 where it expands to the relaxed position on Figure 3, this insertion and the centering of the ring being facilitated by the tapered walls of groove 33. Once this cartridge is assembled these three parts 32, 35 and 36 maintain themselves in assembly as a unit.

The unit is an easily handled cartridge 30 which may be readily placed in position about the lower end of the valve stem 17 as shown in Figure 1, and after follower rings 27 and 29 are placed above the cartridge the gland 24 is inserted and rotated to axially effect displacement of the cartridge down around the valve stem. This exerts sufficient axial pressure to force the inner smooth flat periphery of the diaphragm 21 flat against the smooth flat top surface of the plug 14. These cartridges can be substituted bodily in the field for the hitherto used asbestos gasket assemblies. The inner diameter of relaxed ring 35 is slightly less than the diameter of stem portion 28, and the outer diameter of relaxed ring 36 is slightly greater than the central cylindrical bore 37 of cover 18. As the cartridge is slipped over the stem portion 18, the rings 35 and 36 become radially deformed into sealing engagement with the bore 37 and stem portion 28 but such condition does not interfere with axially sliding of the cartridge to its final operative position or change with axial shift of the cartridge along stem portion 28.

When the gland 24 forces the cartridge 30 axially toward the plug, there is relative rotation between metal ring 27 and the gland surface 26 so that the metal annulus 32 which is contacted above and below by deformable washers 29 and 23 respectively does not tend to rotate about the valve stem as the gland seal becomes tight.

In the assembly of the invention therefore any line fluid which might leak past the inner periphery of diaphragm 21 is effectively baffled and prevented from escaping up the valve stem by the sealing engagement of the deformed inner O-ring 35 with the valve stem portion 28 and any line fluid which might escape outwardly to the bore 37 is prevented from moving outwardly by the sealing engagement of the deformed ring 36 with the cylindrical surface at 37.

Using the novel cartridge of this invention as the seal no matter how much the gland 24 is tightened there is no alteration of the radial sealing action of the deformed rings 35 and 36. In making the assembly which may be done by an unskilled workman it is therefore necessary only to mount the cartridge on the valve stem and tighten the gland 24 until the correct axial pressure is exerted through the cartridge for proper seating of the plug 14 in the seat 13 and slidable clamping of the inner periphery of the diaphragm 21 with plug 14. Thus rotation of the plug 14 between open and closed positions will not affect the radial seal which is entirely independent of the degree of tightening of the gland and the seating pressure exerted by the gland on the plug through the metal annulus 32. The O-rings 35 and 23 are shown somewhat exaggeratedly deformed in Figure 1 to illustrate principles of the invention.

The gland 24 may be bloted in the conventional manner instead of threaded. Also stem 17 may rise from, or be detachably coupled to, a plug of tapered, cylindrical, spherical or other shape without departing from the spirit of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly, a body having a through passage for fluid flow and a plug seat formed in said passage, a ported valve plug rotatably mounted on said plug seat, a stem projecting from said plug through an opening in said body for operating said valve plug, a cover for said opening surrounding the valve stem and rigidly secured to the body, an axially rigid radially deformable seal cartridge surrounding said valve stem within said cover, a gland surrounding said stem outwardly of said cartridge, and means mounting said gland on said cover for adjustment axially of said stem so as to positively displace said cartridge as a unit toward the top of the plug and exert a predetermined positive seating pressure on said plug without further deforming the radial seal between the stem and said cover.

2. In the combination defined in claim 1, said cartridge comprising a rigid annulus having inner and outer recesses open radially, and radially deformable seal rings disposed in each of said recesses, said rings each being arcuate in cross section and each having a radial dimension greater than the radial depth of its recess.

3. In the combination defined in claim 1, said cartridge comprising an annular rigid carrier of substantially I-shape in cross section to define said inner and outer recesses, and said seal rings are elastically mounted in said recesses.

4. In a plug valve assembly, a valve body having a through passage for fluid flow and a plug receiving bore intersecting said passage at right angles, a ported valve plug rotatably mounted in said bore adapted to be turned between positions where it blocks said passage or permits fluid flow through the valve assembly, an operating valve stem for rotating said valve plug and having a cylindrical portion projecting through a cylindrical bore in said valve body, a seal cartridge assembly surrounding said valve stem and comprising an axially rigid annular carrier having cylindrical outer and inner peripheral surfaces provided respectively with continuous external and internal grooves, and flexible O-rings in said recesses radially deformed in the assembly to seal with said valve stem portion and said cylindrical bore respectively, line fluid sealing means disposed between the plug and body inwardly of said cartridge assembly, and a gland mounted for axial displacement in said cylindrical bore for urging said cartridge assembly against said sealing means and in the direction of said plug for adjusting said sealing means without changing the radial deformation of the cartridge assembly seal rings.

5. In a plug valve assembly, a body having an opening, a plug rotatably mounted in the body and having an upper flat surface, a cover rigid with the body, a valve stem having a cylindrical portion extending through a cylindrical bore in said cover, an annular diaphragm having its outer periphery clamped between the cover and body, a circular cartridge comprising an axially rigid carrier assembly provided with internal and external continuous radial recesses and deformable O-rings in said recesses seated upon the inner periphery of said diaphragm with said O-rings radially deformed between the carrier assembly and said stem and bore respectively but said recesses being of sufficient size that said O-rings are not compressed axially of said stem and a gland mounted for axial adjustment in said bore for urging said cartridge against said diaphragm to seat the latter against said top surface of the plug so that said gland may be adjusted to exert predetermined seating pressure against said diaphragm without varying the deformation of said O-rings or changing the character of the radial seal between the valve stem and said cover.

6. In the combination defined in claim 5, said diaphragm comprising a laminated assembly having a rigid ring in slidable contact with said flat plug surface and a compressible ring in contact with said carrier, and wherein a rigid ring surrounds the stem in abutment with the lower end of said gland and a compressible ring surrounds the stem between said rigid ring and said carrier.

7. In a plug valve assembly, a body structure having a through passage for fluid flow and a tapered bore intersecting said passage at right angles, a ported plug rotatably mounted in said bore adapted to be turned between positions where it blocks said passage or permits fluid flow through the valve assembly, a stem for the plug projecting through an opening in the body structure, an annular seal assembly surrounding said stem within the body structure opening above the upper end of said plug and comprising an axially rigid ring and radially expansible seal means, a gland surrounding said stem within said opening axially outward of said seal assembly, and means for adjusting said gland toward the plug so that said axially rigid ring positively transmits plug seating force from the gland to the upper end of said plug without affecting the radial seal of said seal assembly in the opening.

References Cited in the file of this patent

UNITED STATES PATENTS

| | | |
|---|---|---|
| 2,208,394 | Scherer | July 16, 1940 |
| 2,410,808 | Christensen | Nov. 12, 1946 |
| 2,493,966 | Hartley | Jan. 10, 1950 |
| 2,666,659 | Audemar | Jan. 19, 1954 |
| 2,678,837 | Griefen | May 18, 1954 |